June 14, 1960 D. E. CARR 2,940,253
REMOVAL OF CARBON DEPOSITS FROM JET ENGINES
Filed March 26, 1954 3 Sheets-Sheet 2
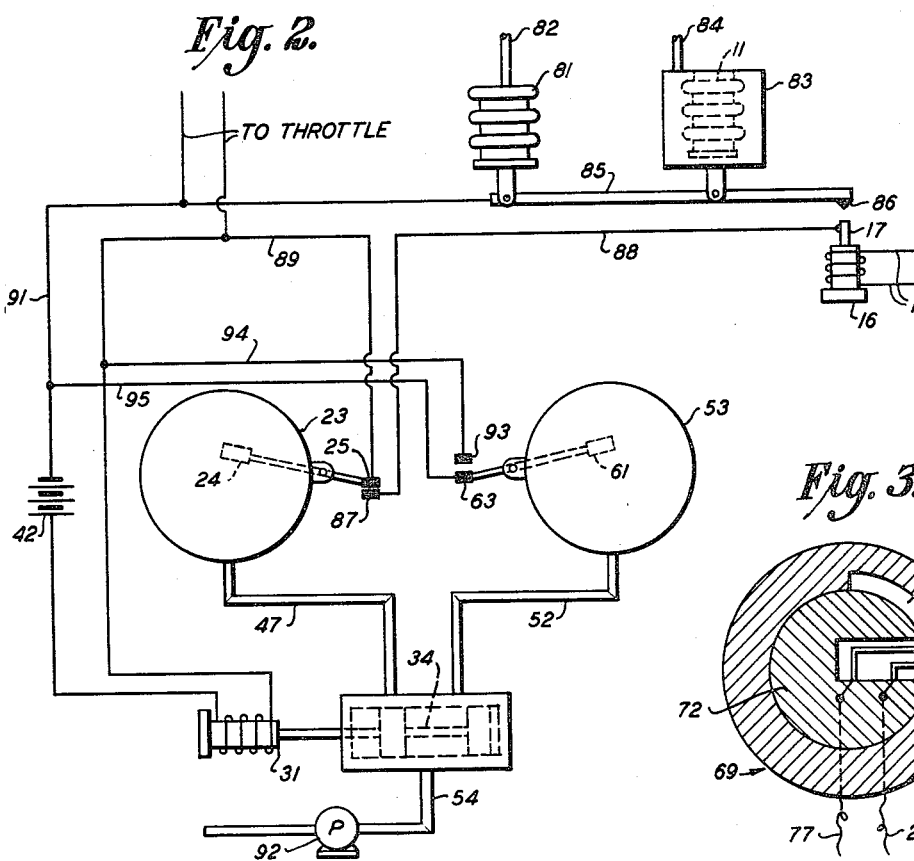
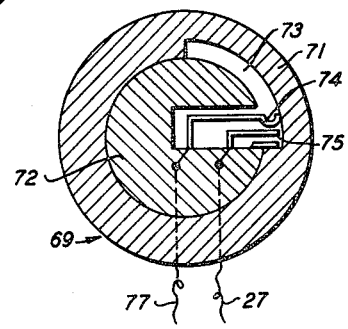
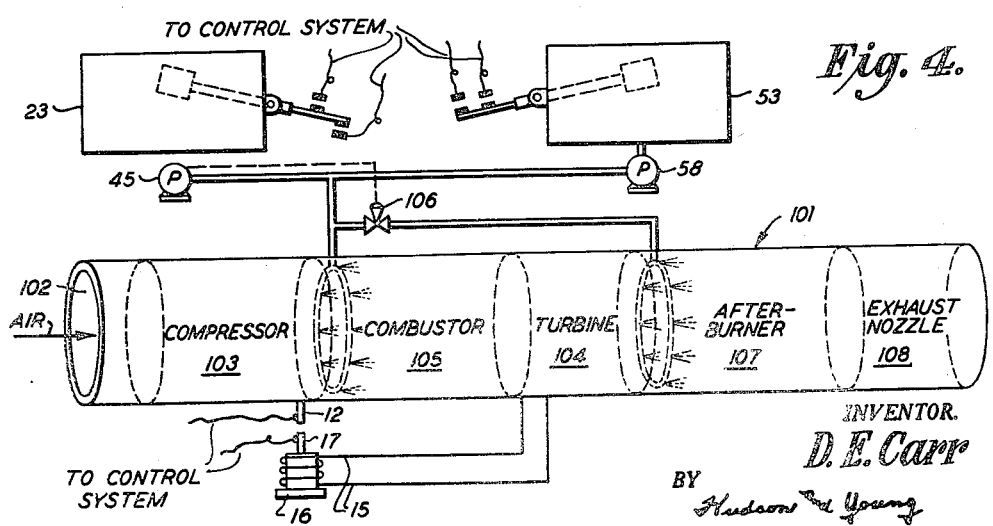
INVENTOR.
D. E. Carr
BY
Hudson and Young
ATTORNEYS

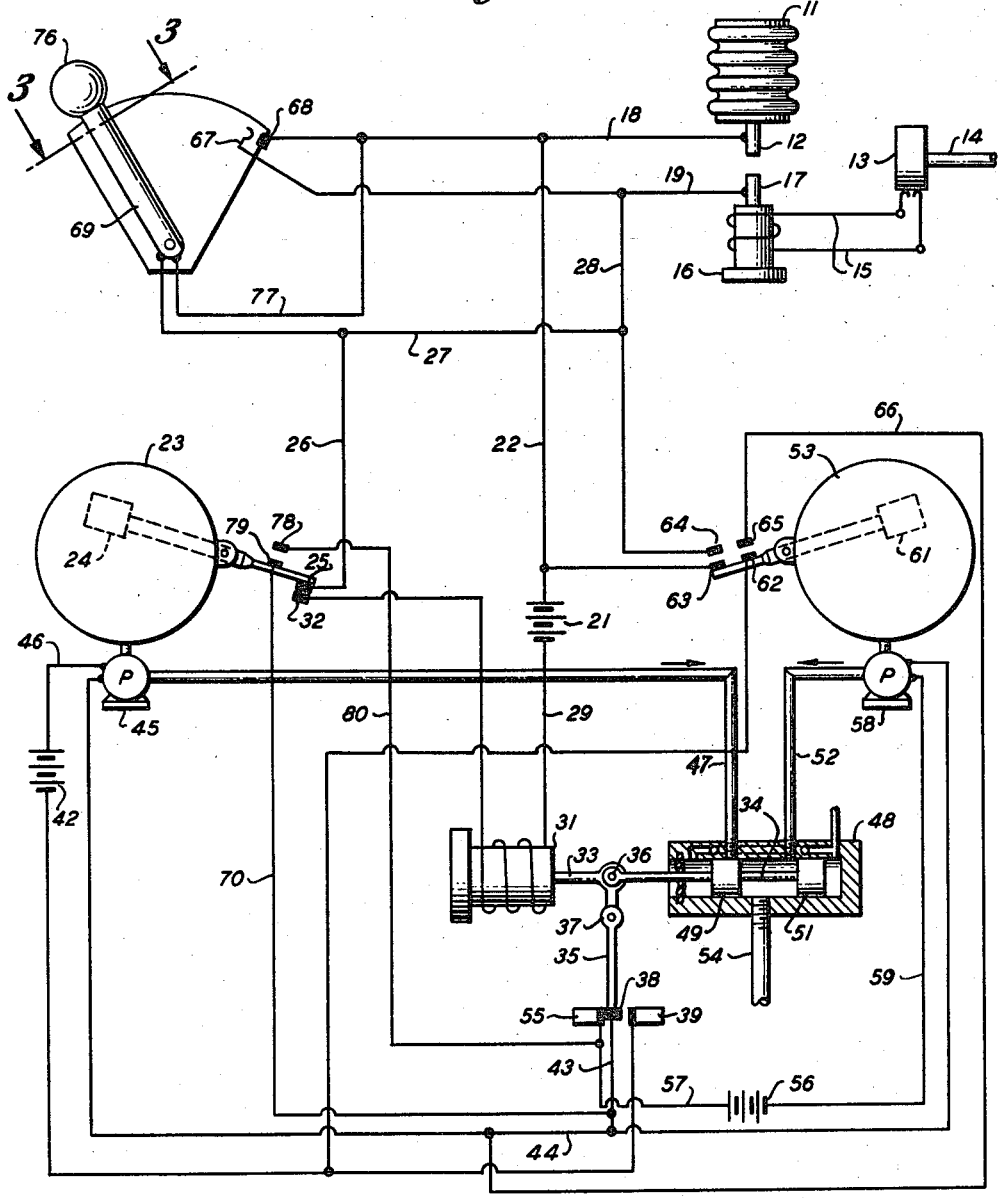
Fig. A.
INVENTOR.
D. E. Carr

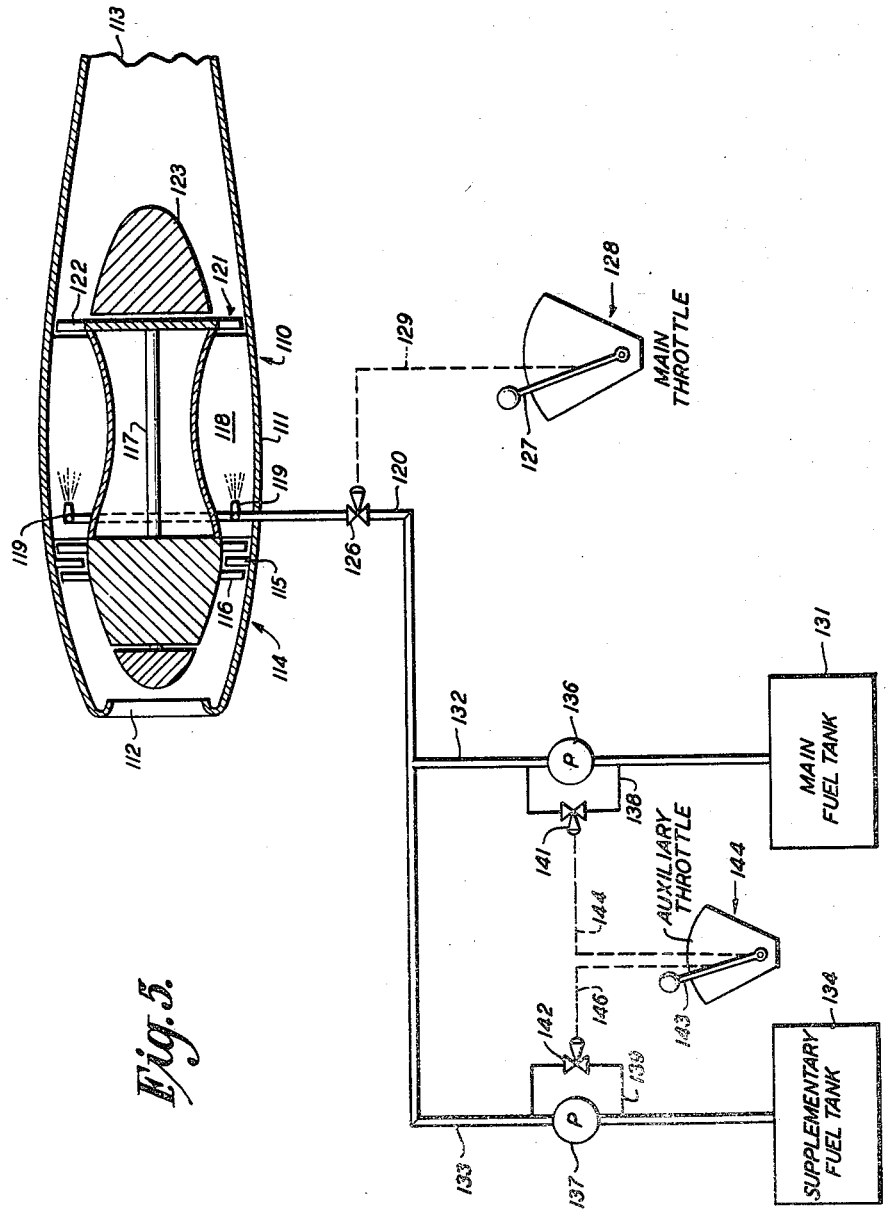

United States Patent Office
2,940,253
Patented June 14, 1960

2,940,253

REMOVAL OF CARBON DEPOSITS FROM JET ENGINES

Donald E. Carr, Bartlesville, Okla., assignor to Phillips Petroleum Company, a corporation of Delaware Filed Mar. 26, 1954, Ser. No. 418,900

6 Claims. (Cl. 60—39.02)

This invention relates to jet engines. In one of its more specific aspects it relates to a method for providing selected fuels for a jet engine. In another of its more specific aspects it relates to a control device for a dual fuel system for a gas turbine. In another of its more specific aspects it relates to the operation of jet engines under widely varying conditions which require different types of fuels for operation under best conditions at marginal limits. In still another of its more specific aspects, it relates to a method of removing carbon deposits which form in the combustion chambers of jet engines.

This is a continuation-in-part of my co-pending U.S. patent application, Serial No. 191,662, filed October 23, 1950, and now issued as U.S. Patent No. 2,677,930.

Jet engines have only in the last few years been used in large numbers for the purpose of propelling aircraft and they have been found to be highly advantageous for use in high speed planes. With the increase in use of such engines, however, a multitude of operational problems have also come to be recognized.

A jet engine comprises three general parts; first, an air intake section; second, a fuel addition and combustion section; and third, an exhaust section. In a turbojet engine, the air intake section and means for effecting such air intake employs a rotating compressor, such as a turbine compressor, operated by a gas turbine as motivating power for introducing the air into the combustion section. The purpose of operation of such an engine is to burn the fuel and to utilize as much as possible of the heat energy added in producing thrust for the engine. In the gas turbine engine, the combustion gases pass through a turbine which utilizes part of the heat energy in the gas in driving the compressor so as to furnish additional air for the combustion zone. The gases then are exhausted to the atmosphere through the exhaust section or tail pipe with a concomitant production of thrust.

Best operation of turbojet engines under conditions requiring peak power output is obtained by introduction of a portion of fuel into what is known as an afterburner. In a sense, an afterburner can be regarded as a ramjet connected to the downstream end of an ordinary turbojet. Afterburners operate at a lower oxygen content than the primary combustion zones of such engines. Under such conditions the problem of maintaining combustion within such a section is a serious one. Because of the complex combustion problems which are encountered in the afterburner, a high performance fuel is to be desired for introduction thereinto.

The general trend of thought concerning the operation of jet engines has been that hydrocarbons do not vary sufficiently in their burning characteristics to make a material difference in the operation of any given jet engine. For that reason, emphasis has for some time been placed on engine research so as to determine the design of a jet engine which would have such a structure as would overcome the multitude of operational difficulties which are inherently encountered in jet engines. Such operational difficulties have to date been only partially overcome by engine design.

The problems which are encountered in the operation of a turbojet engine exemplify those encountered in other jet engines. Performance of a jet engine is dependent to a large extent upon the "temperature rise" which is obtainable in the particular engine. "Temperature rise" is that increase in temperature between the inlet to the combustor and the temperature of the gases in the combustor exhaust outlet. In a turbojet engine the temperature rise must be carefully controlled for the operation of a turbojet engine is limited by the ability of the turbine blades to withstand high temperature. Fuel which is supplied to the combustor is burned in the presence of supplied air and raises the temperature of the combustion gases and unused air by the heat of combustion. An excess of air is conventionally utilized in the operation of turbojet engines to control the temperature of the gases contacting the turbine blades. Such a large quantity of air is utilized in the operation of jet engines that the air flow reaches very high velocities. The high air velocities pose many additional problems in the operation of jet engines, which problems are very difficult to overcome. The hot gases are expanded and in the turbojet engine are expanded through the turbine section which provides power for the compressor. Further expansion of the gases in the turbojet engine takes place through a rearwardly extending exhaust nozzle to provide a substantial increase in gas velocity. The thrust which is produced by the engine equals the gas mass flowing through the exhaust duct times its increase in speed according to the law of momentum.

For each engine speed at a given altitude, a certain temperature rise is required for the operation of any given jet engine. Combustor inlet pressure, fuel atomization, and mass air flow through the engine impose a limitation upon the combustion of any fuel utilized in the operation of the engine. For each combination of combustor inlet pressure, fuel atomization, and mass air flow there exists for any given fuel a maximum attainable temperature rise which depends upon the combustion stability performance of that fuel under the combination of these conditions. As the operation conditions become more severe, a decrease in combustion stability is encountered. One phenomenon which tends to affect temperature rise in any given engine is known as "cycling." Cycling is an indication of instability of combustion of a given fuel. The flame front within the combustor tends to fluctuate back and forth and many times the instability reaches such a degree that the flame is finally extinguished. The point at which combustion will no longer be sustained is known as the "blow-out" or "cut-out" point. Blow-out is the primary controlling characteristic of turbojet engine performance since it defines the thrust output limits at a given altitude. When the temperature rise required at a given engine speed and at a given altitude corresponds to the maximum temperature rise obtainable with a given fuel, a very definite operational limit is imposed upon that jet engine when operating with that specific fuel. In order to operate the engine under more severe operating conditions, it is necessary therefore to obtain and use a fuel which has stable combustion characteristics over a broader range of conditions than the fuel with which the maximum limit of operation has been reached. Similar operational problems are encountered in pulse jet and ramjet engines.

It has been found that many of the operational problems of such jet engines are overcome to a large extent when those engines are operated with a particular hydrocarbon fuel. Hydrocarbon fuels, contrary to general belief, burn differently under different operating conditions. It will thus be seen that although stress has been placed upon research for mechanical design of jet engines, a further limitation is placed upon the individual engines by the particular fuel being utilized. A desirable jet engine fuel should be readily burnable and should facilitate maintenance of the flame in the combustion zone. The fuel should also produce a high thrust for each unit volume burned and should not cause difficulty such as fouling the engine or fuel injection system.

Hydrocarbon fuels which satisfactorily meet the above requirements should be rated in an order of desirability by their ability to impart heat to air entering the combustion zone while maintaining stable combustion therein. Fuels may be rated generally in their order of desirability by operating a particular burner under a particular set of operating conditions which include combustion zone inlet air temperature, mass rate of air flow, and constant outlet pressure. An increase in the rate of fuel addition, when the above conditions are fixed, increases the temperature rise of the air in the combustion zone up to a critical point and after that point has been reached any increase in fuel addition results in decreasing the temperature of the combustion gases. A comparison of the maximum temperature rise $(\Delta Tm)$ with the $\Delta Tm$ obtained with two standard fuels, normal heptane and 2,2,4-trimethylpentane (isooctane) obtained in the same burner and under the same operating conditions makes possible the rating of the tested fuel under such operating conditions. Assigning n-heptane and isooctane arbitrary values of combustion stability of 100 and 0, respectively, the relative combustion stability rating of the test fuel is calculated from the following relation:

$$\sigma = \frac{\Delta Tm, f - \Delta Tm, o}{\Delta Tm, n - \Delta Tm, o} \times 100$$

$\sigma$ = Combustion stability rating
$\Delta Tm, f$ = Maximum stable temperature rise of the test fuel at the test conditions
$\Delta Tm, o$ = Maximum stable temperature rise of isooctane at the test conditions
$\Delta Tm, n$ = Maximum stable temperature rise of n-heptane at the test conditions The qualities which are chiefly required in jet fuels are (1) high density (because of volume rather than weight limitations on fuel carrying capacity); (2) high combustion efficiency; (3) wide range of stable combustion (freedom from blow-out from extreme altitude and accelerative conditions); (4) low freezing point; (5) low evaporization loss at altitude and at quick climb; and (6) low carbon-forming tendency.

Unfortunately, some of these requirements are hopelessly incompatible in the present state of the art. For example, it is not now possible to obtain high density, high combustion performance, and low carbon-forming tendencies from the same fuel as determined by the above method of determining combustion stability. However, as in the case of piston engines, the need for high combustion performance is only an intermittent one and represents, particularly in the case of long range craft such as bombers or transport planes, a relatively small fraction of the total operating time or fuel load.

I have conceived a means and method of operating a jet engine so as to provide fuels for operation of that engine as required by the operating conditions to which the engine is subjected. I propose to use a dual fuel system for turbojet operation. A relatively small tank of fuel of high combustion performance (as shown by high flame speed, for example, is carried separate from a main fuel supply consisting of fuel possessing high density and low volatility but having relatively poor combustion performance under severe conditions. An automatic device actuated by a pick-up inversely responsive either to stagnation pressure in the combustion chamber inlet air or to turbine inlet temperature or to other operating variables which measures severity of combustion conditions is used to control a valve system which causes the introduction into the combustion chamber of high performance fuel under those conditions in which it is needed to replace the main fuel. In the case of jet engines in which an afterburner is used, a portion of such high performance fuel is preferably separately fed into the afterburner under conditions requiring extra thrust. Under mild conditions, however, such as in steady state cruise, the afterburner system is preferably cut out coincidental with suitable adjustment with a variable area nozzle. In accordance with a modification of the present invention, I introduce a high performance fuel into the combustion chamber of a jet engine in order to burn off any carbon deposited therein. The high performance fuel may be introduced separately, or alternatively it may be injected into the combustion chamber along with the main fuel in such a manner that substantially the same temperature level is maintained therein.

Numerous practical advantages can be cited for the dual fuel system in addition to the obvious one of obtaining a satisfactory balance between all of the requirements for jet engine fuels set forth above. For example, an afterburner operating only on high flame speed fuel would not require the elaborate flame holder blockage which is now employed for inferior fuels and pressure losses would hence be greatly reduced. In the main combustor, turbulence and vorticity resulting from the necessity of designing the combustion chamber for stable operation on inferior fuels under severe conditions would be considerably lessened. From the standpoint of carbon-forming tendencies, the auxiliary fuel of high combustion efficiency may be selected not only from the standpoint of clean burning by itself, but for aiding in the burning off of deposits during the use of the main jet fuel.

Removal of carbon deposits during actual operation of a continuous combustion engine by using in conjunction therewith an auxiliary fuel of high combustion efficiency becomes of primary importance when operating the engine on a main fuel of high carbon deposition tendency. It has been found that use of such main fuels often causes a deposit of carbonaceous materials in the combustion chamber of the engine, particularly in the upstream end thereof where rich fuel-air mixtures are found. The deposition of such materials has a deleterious effect on continuous combustion engines in general because the presence of such materials results in the formation of hot spots on the inner surface of the combustion chamber, thereby promoting subsequent failure of that chamber. Furthermore, the presence of the carbon deposit in the combustion chamber disturbs the air and fuel flow therein causing the combustion efficiency of the engine to be materially reduced. Still again, serious damage to the engine may result from chunks or pieces of carbon breaking away from the surface of the combustion chamber. This latter problem becomes especially serious in the case of turbojet engine operation where the pieces of carbon may be blown into the blades of the high speed turbine. By utilizing a high combustion efficiency fuel, such as hydrogen, normal paraffins such as methane, ethane, propane and butane, or other aliphatic hydrocarbon fuels, in conjunction with the main fuel as described more in detail hereinafter, the problem of carbon deposit in the operation of continuous combustion engines is substantially eliminated.

Examples of very high performance fuel for use in the auxiliary fuel systems are propylene oxide and similar oxides, compounds of furan structure, ethers, alpha olefins, and normal paraffins. Typical of high density main fuels would be cat-cracked cycle stock and solvent extracts in the kerosene or gas oil boiling range.

An object of this invention is to provide an improved means for operating turbojet engines. Another object of the invention is to provide an improved method for operating turbojet engines. Another object of the invention is to provide an improved control device for a dual fuel system for a gas turbine. Another object of the invention is to provide a means and method for selecting and feeding a fuel having necessary properties to obtain satisfactory operation under all limits of turbojet engine operation at the greatest possible economy and efficiency. Another object of the invention is to provide a means and method for materially reducing the pressure losses encountered in turbojet engines. Another object of the invention is to provide a means and method for lessening turbulence and vorticity losses in the combustion chamber of turbojet engines. A further object of the invention is to provide a means and method for removing carbon deposits which form in the combustion chambers of jet engines. Other and further objects and advantages will be apparent to those skilled in the art upon study of the accompanying disclosure.

Better understanding of this invention will be obtained by those skilled in the art upon study of the accompanying drawings in which Figure 1 is a schematic fuel control and electrical flow diagram utilized in the operation of my control device for the dual fuel system for gas turbines. Figure 2 is a preferred modification of a fuel control and electrical flow diagram of this invention. Figure 3 is a cross-section of the throttle control member taken along the line 3—3 of Figure 1. Figure 4 is a diagrammatic representation of a turbojet engine showing the relationship between the control device for dual fuel systems and the turbojet engine. Figure 5 is a diagrammatic elevation, partly in section, of a turbojet engine including a fuel flow diagram, suitable for practicing the modification of my invention whereby carbon deposits are removed from the combustion chambers of continuous combustion engines.

Referring particularly to Figure 1 of the drawings, a number of switches are diagrammatically shown by pairs of indicated electrical contact members. Bellows 11 is evacuated and is connected at one end to contact member 12. Bellows 11 is preferably positioned at the outlet end of the compressor of a turbojet engine so as to be subjected to any increase or decrease of air pressure therefrom. If the pressure decreases, bellows 11 extends so as to cause contact member 12 to extend in a longitudinal direction. As pressure increases, bellows 11 is compressed, thereby causing the retraction of contact member 12 in a longitudinal direction. Tachometer 13 is connected by member 14 to a generator, not shown, which in turn is driven by the engine or turbine. As the engine speed increases, a current is set up through electrical conduit 15 which conduit provides a wrapping for solenoid 16. As the current passes through electrical conduit 15, solenoid 16 is energized and causes its core which is rigidly connected to contact member 17 to be drawn into the magnetic field set up therein. Contact member 17 is thus drawn toward solenoid 16. As the engine speed decreases, the current passed through electrical conduit 15 likewise decreases, thus proportionately de-energizing solenoid 16 allowing its core member to be extended by a spring loading, not shown. As the pressure and engine speed decrease, contacts 12 and 17 extend in opposite longitudinal directions until they make contact with one another. As contacts 12 and 17 come together they close one portion of an electrical circuit. Electrical conduit 18 is connected to contact member 12 and electrical conduit 19 is connected to contact member 17. Electrical conduit 18 is connected to a power supply 21 by means of electrical conduit 22.

Fuel tank 23 contains a high performance fuel described above. Float member 24 is operatively connected to a contact member 25, preferably positioned outside of tank 23, contact member 25 being moved in response to movement of float member 24 within tank 23. Contact member 25 is connected to electrical conduit 19 by means of electrical conduits 26, 27, and 28. Electrical conduit 29 is connected at one end to power supply source 21 and provides wrappings for solenoid 31 being connected at its opposite end to contact member 32. When float member 24 is raised in any respect from the bottom of fuel tank 23, contact members 25 and 32 are brought together, thus completing the circuit set up through electrical conduits 18, contact member 12, contact member 17, electrical conduits 19, 28, 27, 26, contact members 25 and 32, and electrical conduit 29.

When the electrical circuit is closed by bringing together contact members 12 and 17 and 25 and 32, respectively, solenoid 31 is energized so as to draw its core into the magnetic field set up therein. The core of solenoid 31 is rigidly connected to drive member 33 which in turn is connected to valve 34. Valve 34 comprises two valve heads which are spaced apart and connected by a common valve stem which forms drive member 33. The two valve heads are fitted within valve housing 48 which is provided with fuel inlets 47 and 52 spaced apart longitudinally therein. When one valve head closes one fuel inlet the other valve head opens the other inlet. As valve 34 is drawn in the direction of solenoid 31 by the core thereof, connection member 35 which is pivotally connected to member 33 at pivot 36 and is also pivoted from a stationary member at pivot 37, is caused to move toward solenoid 31 at its upper end and to move contact member 38 affixed to the lower end of member 35 into contact with contact member 39 which is, under normal conditions, spaced from contact member 38 which contacts together with contact 55 form a selector switch. Contact member 39 is connected by means of electrical conduit 41 to power supply 42. Contact member 38 is connected by means of electrical conduits 43 and 44 to electrical pump 45. Pump 45 is connected to power supply source 42 by means of electrical conduit 46. Pump 45 is provided in fuel conduit 47 which extends from fuel tank 23 to valve housing 48.

As solenoid 31 is energized so as to draw valve 34 in the direction of the solenoid and thus cause contact between contact members 38 and 39, valve head 49 is caused to open conduit 47 and valve head 51 is caused to close fuel conduit 52 which extends from fuel tank 53, tank 53 containing the main fuel for operation of the turbojet engine. As contact members 38 and 39 are brought together the electrical circuit from power supply source 42 through pump 45 and contact members 38 and 39 is completed causing pump 45 to go into operation and supply fuel from tank 23 through conduit 47 and valve housing 48 to a fuel metering control, not shown, through fuel conduit 54. Although only a single fuel outlet 54 is shown from valve housing 48, individual fuel outlets can be provided so as to be alternately opened and closed as are inlet conduits 47 and 52.

As the engine speed increases or as the compressor outlet pressure increases, contact members 12 and 17 are caused to retract in opposite longitudinal directions, thus breaking the contact therebetween and de-energizing solenoid 31. As solenoid 31 is de-energized a spring loading therein, not shown, causes its core to extend therefrom thus causing valve 34 to move in a direction away from solenoid 31. At the same time member 35 is pivoted at 37 so as to cause a break between contacts 38 and 39, thus inactivating motor 45. As valve 34 moves away from solenoid 31, valve head 49 closes conduit 47 and valve head 51 opens conduit 52. Contact member 38 on member 35 is caused to come into contact with contact member 55. Contact member 55 is connected to power supply 56 by means of electrical conduit 57. Contact member 38 is connected by means of electrical conduit 44 to electrical pump 58. Electrical pump 58 is also connected to power supply 56 by electrical conduit 59. Thus as contact members 38 and 55 are brought together an electrical circuit which includes those two contact members and pump 58 is closed, causing pump 58 to go into operation. Valve head 51 is caused to open fuel conduit 52 as fuel conduit 47 is closed, thus allowing the main fuel from tank 53 to be pumped through fuel conduit 52, valve housing 48, and fuel conduit 54 to the fuel metering control, not shown. Although the valve system has been shown as being contained in a single housing 48 it is clearly within the scope of this invention to utilize two separately housed valves actuated by solenoid 31.

Float member 61 within fuel tank 53 is connected to contact members 62 and 63 which are preferably provided outside of fuel tank 53. Contact members 62 and 63 are caused to move in response to movement of float member 61 within fuel tank 53. Contact member 64 is connected to one end of electrical conduit 28. Contact member 65 is connected by means of electrical conduit 66 to electrical conduit 44. As the level of fuel within fuel tank 53 decreases to such an extent that float member 61 drops to the bottom of that tank, contact members 63 and 62 are brought into contact with members 64 and 65, respectively, so as to close the circuit which includes power source 21, solenoid 31, and pump 45 causing conduit 52 to be closed and conduit 47 to be opened by valve 34, and pump 45 to be actuated so as to supply fuel from tank 23 through valve housing 48 and conduit 54 to fuel metering control, not shown. Contact members 62 and 65 form a safety switch which assures the completion of the electrical circuit to actuate pump 45.

Under some energizing conditions, such as in combat or extremely high rate of climb, it is desirable to provide manual actuated control means whereby the pilot can over-ride the automatic system of fuel control so as to supply the high performance fuel to the jet engine. This manual control means is provided by placing a flexible contact member 67 at the full advance end of the throttle arm bracket. Contact member 67 is connected to electrical conduit 19. Contact member 68 is connected to one end of electrical conduit 18 and is positioned so as to be in the path taken by contact member 67 as it is flexed under pressure exerted by the throttle control lever 69 as it is forced into a fully advanced position by the pilot. As contact member 67 is forced into contact with contact member 68, the electrical circuit which includes power source 21, solenoid 31, and pump 45 is completed so as to cause fuel conduit 47 to be opened to the flow of fuel from tank 23, thus supplying high performance fuel for jet engine operation.

Under some conditions of operation such as in rainy weather and the like, it is desirable to operate a turbojet engine with high performance fuel without extending the jet engine to full power performance. For that reason a second manual control over-riding means is provided by which the pilot is enabled to selectively feed the high performance fuel to the jet engine rather than the main fuel. Better understanding of this second manual selection device will be obtained upon reference to Figure 3 of the drawings. Throttle lever 69 comprises an outer shell 71 and a rotatable shaft 72 provided therein. A slot 73 is provided within shell 71 so as to provide free rotational movement therein of contact members 74 and 75 with shaft 72. As shaft 72 is rotated within shell 71 by means of handle 76 shown in Figure 1, contact member 75 is brought into contact with a shoulder within shell 71 and is prevented from continuing its path of rotation. As further force of rotation is exerted upon handle 76, shaft 72 forces contact member 74 into contact with contact member 75. Contact 75 is connected to electrical conduit 27 and contact 74 is connected to electrical conduit 18 by means of electrical conduit 77. Thus as contacts 74 and 75 are brought together, the electrical circuit which includes power source 21, solenoid 31, and electrical pump 45 is completed so as to bring about the supply of fuel from tank 23 through fuel conduit 47 and to cut off the supply of fuel from tank 53 through fuel conduit 52 as discussed above.

When float 24 is lowered to the bottom of tank 23 by reason of substantially total removal of fuel therefrom, contacts 25 and 32 are caused to separate, thus breaking the circuit and de-energizing solenoid 31 and in that manner stopping pump 45 and closing conduit 47. As contacts 25 and 32 are separated, contacts 78 and 79 which form a safety switch are brought together. That closes the circuit which includes electrical conduits 80, 57, power source 56, conduit 59, pump 58, and conduits 44, 43, and 70. Pump 58 is put into operation in this manner so as to supply fuel through conduit 52, valve housing 48, and conduit 54 to fuel metering control, not shown.

The device set forth in Figure 2 of the drawings includes one additional very important operational condition as a controlling feature for the selection of a fuel for the turbojet engine. Temperature as well as pressure of the air supply is used in conjunction with engine speed so as to control the selection of the fuel charge. These three variables are individually sensed by separate mechanisms and the fuel is charged to the engine as chosen thereby. Bellows 81 is responsive to temperature and may be actuated by the air temperature at the inlet or outlet of the compressor. The bellows may be filled with a liquid which expands with an increase and contracts with a decrease in temperature and is connected by means of conduit 82 to a liquid supply source, not shown, at the point chosen for temperature sensing. Bellows 11 may be enclosed within a chamber 83, which chamber is connected to the compressor outlet by means of conduit 84. Bellows 11, as described in connection with Figure 1, is caused to elongate upon a decrease in pressure and to contract upon an increase in pressure. Bellows 81 and 11 are pivotally connected to arm 85 which is provided with contact member 86 at one of its ends. Contact 86 is thus caused to move in response to the combination of action of bellows 11 and 81 thereon in response to temperature and pressure within the turbojet engine. Solenoid 16 is energized as described in connection with Figure 1 of the drawings in response to engine speed, contact member 17 extending as engine speed decreases and being retracted as engine speed increases. Contact member 25 which moves in response to the position of float member 24 within fuel tank 23 contacts contact member 87 until float member 24 is dropped to the bottom portion of fuel tank 23 by reason of a total removal of fuel from that tank. Thus as contact members 17 and 86 are brought together by the effect of temperature, pressure, and engine speed thereon, upon contact, a circuit is completed which includes electrical conduits 88 which extends between contact member 17 and contact member 87, conduit 89 which provides a wrapping for solenoid 31, power supply source 42, and electrical conduit 91 which is connected to member 85. As solenoid 31 is actuated, valve 34 is caused to move as described in connection with the operation of the device shown in Figure 1 of the drawings. Thus flow of fuel from tank 53 through conduit 52 is stopped and flow of fuel through conduit 47 from tank 23 is started. In this specific modification, a single pump 92 is provided which remains in constant operation in connection with conduit 54. Thus one or the other of the fuels is supplied to the fuel metering control by the constant operation of pump 92. Contact member 93 is connected to electrical conduit 89 by means of electrical conduit 94. As float member 61 drops to the bottom of fuel tank 53 upon the substantially total removal of fuel therefrom, contact member 63 is brought into contact with contact member 93, thereby closing the circuit which includes electrical conduits 94, 89, power supply 42, electrical conduit 91, and electrical conduit 95 which extends between conduit 91 and contact member 63. In this manner an automatic arrangement is provided whereby the high performance fuel is supplied to the engine at any time that the supply of fuel in tank 53 becomes depleted. Pairs of switches which have been described hereinabove diagrammatically represent switches which are opened or closed in the manner described.

Although a single pump 92 has been shown in connection with this specific modification, it is within the scope of this invention that individual pumps may be provided in conduits 47 and 52 as described and shown in connection with Figure 1 of the drawings, these individual pumps being actuated in the manner described in connection therewith.

Specific operation of a turbojet engine by means of the control system described above will be better understood upon reference to Figure 4. Air is introduced into turbojet engine 101 at inlet 102 thereof. The air is passed through compressor section 103, which compressor is driven by turbine 104 downstream of combustor section 105. Contact members 12 and 17 are extended or retracted as described in connection with Figure 1 of the drawings. Contact member 12 could be replaced by a contact member 86 as described in connection with Figure 2. Fuel which is selected by the variable conditions obtained from within the turbojet engine is fed from fuel tanks 23 or 53 to the forward end of combustor section 105. The fuel is burned within combustor section 105 and the expanded gases pass downstream through turbine 104 so as to provide rotation thereof. As pointed out above, an afterburner is a rather inefficient section of a turbojet engine, and for that reason a high performance fuel is ordinarily desired for the operation thereof. Thus in the method of operation which I propose, valve 106 is opened upon actuation of pump 45 by closure of its actuating circuit so as to supply high performance fuel to afterburner section 107. Valve 106 is closed when the actuating circuit for pump 45 is opened. The total expanded gases obtained from the combustor section and the afterburner section are exhausted through exhaust nozzle 108 providing the thrust for the jet engine.

As discussed above, when operating continuous combustion engines with typical high density hydrocarbon fuels, such as those boiling in the kerosene or gas oil boiling range, carbonaceous materials tend to deposit in the combustion chamber of the engines. It has been discovered that the carbonaceous deposits so formed may be burned out during operation of the engine by utilizing a clean burning, high performance fuel, such as propane in conjunction with the main fuel. A better understanding of this modification of my invention may be obtained by reference to Figure 5, which illustrates a turbojet engine 110 having a generally cylindrical body 111.

Body 111 provided at one end with an air intake 112 has an exhaust outlet 113 at its other end. A compressor 114, positioned within the body adjacent the air inlet, includes a stator 115 secured to body 111 and a rotor 116 carried by a shaft 117 which is journaled within body 111. Downstream of compressor 114, at least one combustion chamber 118 is disposed within body 111. At least one fuel nozzle 119 is positioned at the upstream end of each combustion chamber, all of the nozzles being supplied fuel through fuel line 120. A turbine 121 comprising a series of blades 122 and positioned downstream from combustion chamber 118 is attached to shaft 117. Hot combustion gases leaving the combustion chamber impinge blade 122, rotating turbine 121, shaft 117 and rotor 116 of compressor 114. Downstream of the turbine is a discharge air regulating plug 123.

While the turobjet engine has been described with a certain degree of particularity, it is to be understood that the invention is not limited to the specific turbojet engine illustrated. Accordingly, a plurality of combustion chambers spaced in annular formation and each provided with suitable fuel injection means may be utilized instead of the single annular combustion chamber as illustrated. Furthermore, a prevaporizer type combustion chamber may be employed in which case the fuel is passed through vaporizer tubes positioned within a combustion chamber and therein vaporized prior to ignition. The vaporization of the fuel by this latter method rather than by the use of nozzles is well known in the art and comes within the scope of the present invention. Furthermore, it is to be understood that the turbojet engine as shown is merely illustrative of one type of jet engine to which my invention is applicable. The invention is also applicable to the operation of stationary power plants in which a fuel oil is burned in a combustion chamber to supply hot gases for driving a turbine.

Valve 126 in fuel line 120 is connected to throttle lever 127 of main throttle 128 by means of mechanical linkage 129. Movement of throttle lever 127 results in the opening or closing of valve 126, thereby providing means for controlling the amount of fuel supplied to combustion chamber 118. Main fuel tank 131 is connected to fuel line 120 by means of line 132 while supplementary fuel tank 134 is connected to line 120 by line 133. Main fuel pump 136 is contained in line 132 while supplementary fuel pump 137 is contained in line 133. By-pass lines 138 and 139, which are connected to fuel lines 132 and 133 on either side of the fuel pumps, contain valves 141 and 142, respectively. Valves 141 and 142 are operatively connected to throttle lever 143 of the auxiliary throttle 144 by means of mechanical linkages 144 and 146, respectively. Valves 141 and 142 may advantageously be needle valves, valve 141 being adapted to open and valve 142 being adapted to close on advancement of throttle lever 143. The needle valves are so constructed that on advancement of throttle lever 143 the decrease in the calorific value of the main fuel flowing through line 132 is substantially equal to the calorific valve of the high performance fuel flowing through line 133.

In normal operation of the turbojet engine of Figure 5, the main fuel is pumped through fuel line 120 from main fuel tank 131 and is then sprayed into combustion chamber 118 through nozzles 119. The fuel burns with air in the combustion chamber, the resulting combustion gases being thereafter exhausted through exhaust outlet 113 at an exit velocity higher than the flying speed of the engine. During such periods of normal operation, valve 141 in by-pass line 138 is closed while valve 142 in by-pass line 139 is open. It should be apparent that under these conditions main fuel only is being introduced into the combustion chamber in an amount dependent upon the position of throttle lever 127 which regulates the setting of valve 126. It has been found that the conventional jet engine fuels tend to form carbon deposits within the combustion chamber, especially in the upstream end thereof where rich fuel-air mixtures are to be found. It has also been found that carbon tends to deposit around the fuel nozzles, impeding flow of fuel into the combustion chamber. It has been discovered that the carbon which tends to form in the combustion chamber may be burned out by utilizing in conjunction with the main fuel a clean burning, high performance fuel. The frequency of introduction, the period of introduction and the amount of high performance fuel used depend upon the particular main fuel utilized and upon the specific jet engine employed. The high performance fuel will in general be introduced periodically into the combustion chambers during flight so as to prevent any appreciable accumulation of carbon deposits therein and in an amount sufficient to remove any carbon deposits which may have formed. In supplying the high performance fuel to the combustion chambers, it is preferred to effect the addition with a simultaneous reduction in the flow of the main fuel to the combustion chambers so that the temperature level in the combustion chambers is maintained substantially unchanged by its introduction.

When it is desired to introduce the high performance fuel into the combustion chambers, throttle lever 143 is advanced, thereby simultaneously moving valve 142 toward its closed position and valve 141 toward its open position. During normal operation, valve 142 has been completely open, with the result that all of the supplementary fuel pumped by pump 137 has been returned to the intake side of the pump. Upon movement of normally open valve 142 toward its closed position, supplementary fuel is pumped through line 133 to line 120. The simultaneous movement of normally closed or partially closed valve 141 toward its open position results in a portion of the main fuel discharged from pump 136 being returned to the intake side of the pump through by-pass line 138. Since valves 141 and 142 are both mechanically connected to throttle arm 143, the amount that these valves are opened and closed is dependent upon the advancement given throttle arm 143. Furthermore, valves 141 and 142 are so adapted that when valve 142 is moved toward its closed position to permit supplementary fuel to flow to the combustion chambers, valve 141 is opened so as to permit an amount of main fuel having substantially the same calorific value as the supplementary fuel supplied through line 133 to be passed through by-pass line 138 to the inlet side of pump 136. By operating in this manner, the calorific value of the composite fuel supplied to the combustion chamber is substantially the same as that of the main fuel supplied to the combustion chamber during normal operation prior to advancement of throttle arm 143. The temperature level within the combustion chamber remains, therefore, substantially unchanged by introduction of the supplementary fuel.

The high performance fuel is injected into combustion chambers 118 through nozzles 119 along with the reduced supply of main fuel. Since the high performance fuel has a high rate of flame propagation, the location of the flame in the combustion chamber is caused to move upstream so as to be adjacent points therein where the carbon has the greatest tendency to deposit. The deposits of carbonaceous materials ignited by the proximity of the flames are thereby burned from the surfaces of the combustion chamber and from around the fuel nozzles. The introduction of the high performance fuel into the combustion chambers is continued for a short period of time, usually less than one minute in duration, after which time throttle arm 143 is moved to its retarded position. Movement of throttle arm 143 returns valves 141 and 142 to their original closed and open positions for normal operation so that main fuel only is thereafter injected into the combustion chamber.

While the main fuel and supplementary fuels have been described and illustrated as entering the combustion chambers through the same nozzles 119, it is within the contemplation of the invention to utilize separate nozzles for the main fuel and the supplementary fuel. Furthermore, other suitable arrangements of apparatus may be utilized for supplying the main and supplementary fuels to the combustion chambers so as to maintain the temperature level therein substantially unchanged without departing from the scope of the invention.

While it is preferred to operate as described above so that the temperature level in the combustion chambers is maintained substantially unchanged by introduction of the high performance fuel, it is within the contemplation of the invention to terminate the supply of main fuel and inject the high performance fuel separately during the period of carbon removal. By utilizing the manual actuated control means of Figure 1, the high performance fuel may be supplied to the combustion chambers at any desired time. Since it is necessary, however, to move throttle control lever 69 to its fully advanced position in order to terminate the supply of main fuel and start the flow of supplementary fuel when utilizing the system of Figure 1, it is preferred to employ in conjunction with Figure 1 the second manual selection device shown in Figure 3. By means of the second manual control overriding means, the high performance fuel may be selectively fed to the jet engine at any desired time. The high performance fuel so supplied to the jet engine acts to burn off the carbon deposits which tend to form in the combustion chambers in the same manner as described above, with the exception that the temperature level therein may fluctuate from that which prevailed during normal operation.

A more comprehensive understanding of the invention may be obtained by reference to the following example which is not intended, however, to be unduly limitative of the invention.

A turbojet engine, similar to that illustrated in Figure 5, is operated at a fuel-air ratio of about 0.02. A cat-cracked cycle stock hydrocarbon fuel in the gas oil boiling range is supplied to the combustion chamber at an inlet temperature of about 70° F. Air is supplied to the combustion chamber at an inlet pressure of about 5 atmospheres at a mach number of about 0.10 and at an inlet temperature of about 200° F. The hydrocarbon fuel and air are burned within the combustion chamber forming combustion gases which are thereafter expanded through the turbine section to provide power for the compressor. The gases are then further expanded through the rearwardly extending exhaust duct at a velocity greater than that of the flying speed of the engine. Under these conditions of operation, the temperature within the combustion chamber is about 1500° F. The combustion of the fuel results in the formation of carbon in the combustion chamber, especially at the upstream end of that chamber. After a period of about one hour's operation the carbon laydown in the combustion chamber has reached such proportions that its removal is desirable. Accordingly, the auxiliary throttle is moved to an advanced position, thereby causing supplementary fuel propane to be passed into the combustion chamber along with a reduced amount of the main hydrocarbon fuel. The composite fuel maintains the temperature level within the combustion chamber substantially unchanged at about 1500° F. After a period of about one minute, the carbon is burned out, and the auxiliary throttle is returned to its closed position. The main hydrocarbon fuel is now supplied to the combustion chamber as the sole fuel in an amount sufficient to maintain the temperature level within the combustion chamber unchanged at about 1500° F.

A turbojet engine is operated at a fuel-air ratio within the range of 0.005 to 0.040, preferably between 0.01 and 0.03. It is within the scope of this invention to operate the turbojet engine with the fuels described above and with the injection of oxygen. If oxygen or an oxygen-supplying compound such as peroxide is used for the purpose of supplying oxygen rather than air, the fuel-air ratio will necessarily have to be adjusted accordingly so as to maintain a fuel-oxygen ratio equivalent to the fuel-air ratio disclosed herein. Air is supplied to a turbojet engine at a combustor inlet air pressure of between 0.2 and 30 atmospheres at a mach number ranging between 0.01 and 0.80. "Mach number" is defined as the ratio of the velocity of gas to the local velocity of sound in the gas. A turbojet combustor is preferably operated at between 0.5 and 10 atmospheres and at a mach number between 0.02 and 0.30. Fuel is supplied to the combustor of a jet engine at a temperature range between −60° F. and 240° F., preferably at a fuel inlet temperature of between 40° F. and 100° F. Air which is supplied to the combustor of a turbojet engine is preferably supplied at an inlet air temperature of at least −30° F. ordinarily between −30° F. and 740° F., and preferably between 90° F. and 440° F. When operating a turbojet engine within the above range of conditions the jet fuels utilized by the method of this invention burn within a combustion efficiency range between 40 percent and 100 percent and ordinarily within the range of 85 percent to 100 percent. The exact fuel-air ratio which is utilized is dependent upon engine design limitations such as turbine durability and the like. Fuel injection temperatures are dependent upon fuel characteristics such as freezing point and volatility characteristics as well as upon injection nozzle characteristics.

Many modifications of this invention will be apparent to those skilled in the art upon study of the accompanying disclosure and the drawings. These modifications will be obvious and are believed to be within the spirit and the scope of this disclosure.

I claim:

1. In a method of operating a jet engine having at least one combustion chamber of fixed size wherein a main fuel is continuously burned with air under operating conditions and a high performance fuel capable of effecting the combustion of carbonaceous deposits and burning without leaving a residue is also burned, the improvement which comprises increasing the supply of said high performance fuel while decreasing the supply of said main fuel to said combustion chamber so that the temperature level therein remains substantially unchanged by the addition of said high performance fuel; burning said high performance fuel with air in said combustion chamber along with said main fuel so as to ignite and burn off carbon deposited therein; exhausting the resulting combustion gases from said combustion chamber; and decreasing the supply of said high performance fuel while simultaneously increasing the supply of said main fuel to said combustion chamber so as to maintain the temperature level therein substantially unchanged.

2. The method of claim 1 wherein said high performance fuel is propane.

3. The method of claim 1 wherein said high performance fuel is butane.

4. The method of claim 1 wherein said high performance fuel is ethane.

5. The method of claim 1 wherein said high performance fuel is methane.

6. The method of claim 1 wherein said high performance fuel is hydrogen.

References Cited in the file of this patent

UNITED STATES PATENTS

| | | |
|---|---|---|
| 2,050,978 | Thacher | Aug. 11, 1936 |
| 2,313,730 | Boesing | Mar. 16, 1943 |
| 2,409,611 | Bodine | Oct. 22, 1946 |
| 2,432,502 | Bentley | Dec. 16, 1947 |
| 2,563,101 | Colwell et al. | Aug. 7, 1951 |
| 2,574,321 | Duncan | Nov. 6, 1951 |
| 2,579,215 | Te Nuyl | Dec. 18, 1951 |
| 2,632,294 | Wall | Mar. 24, 1953 |
| 2,647,566 | Haynie | Aug. 4, 1953 |
| 2,659,199 | Thompson | Nov. 17, 1953 |
| 2,677,930 | Carr | May 11, 1954 |
| 2,771,741 | Barnard | Nov. 27, 1956 |

FOREIGN PATENTS

| | | |
|---|---|---|
| 11,756 | Great Britain | May 20, 1913 |